United States Patent
Yano et al.

(10) Patent No.: US 6,597,108 B2
(45) Date of Patent: Jul. 22, 2003

(54) MULTI-COLOR EL PANEL COMPRISING PHOSPHOR THIN FILMS WITH EUROPIUM AS LUMINESCENT CENTER

(75) Inventors: Yoshihiko Yano, Tokyo (JP); Katsuto Nagano, Tokyo (JP)

(73) Assignee: TDK Corporation, Tokyo (JP)

( * ) Notice: Subject to any disclaimer, the term of this patent is extended or adjusted under 35 U.S.C. 154(b) by 96 days.

(21) Appl. No.: 09/970,669

(22) Filed: Oct. 5, 2001

(65) Prior Publication Data

US 2003/0020396 A1 Jan. 30, 2003

(30) Foreign Application Priority Data

Jul. 27, 2001 (JP) .......................... 2001-228272

(51) Int. Cl.⁷ .................. H01J 1/63; H05B 33/00; H05B 33/14
(52) U.S. Cl. ................ 313/503; 313/502; 313/506; 252/301.4 R; 252/301.45
(58) Field of Search .................. 313/498, 502, 313/503, 500, 506, 509; 428/690, 917; 252/301.4 R, 301.4 S; 315/169.3, 169.4

(56) References Cited

U.S. PATENT DOCUMENTS

| | | | | |
|---|---|---|---|---|
| 5,559,403 A | * | 9/1996 | Sakai et al. ............... | 315/169.4 |
| 6,180,029 B1 | * | 1/2001 | Hampden-Smith et al. ...... | 252/301.4 R |
| 6,252,254 B1 | * | 6/2001 | Soules et al. ................. | 257/89 |
| 6,255,670 B1 | * | 7/2001 | Srivastava et al. ............ | 257/89 |
| 6,445,119 B1 | * | 9/2002 | Mori et al. .................. | 313/485 |
| 6,451,460 B1 | * | 9/2002 | Sun et al. ................... | 428/690 |

FOREIGN PATENT DOCUMENTS

| | | |
|---|---|---|
| JP | 7-122364 | 5/1995 |
| JP | 8-134440 | 5/1996 |

OTHER PUBLICATIONS

M. Kawanishi, et al., Technical Report of IEICE. EID98–113, pp. 19–24, "CaAl$_2$S$_4$:Ce Thin Film EL Devices Prepared by the Two Targets Pulse Electron–Beam Evaporation," 1999–2001 (with English Abstract).

N. Miura, et al., Jpn. J. Appl. Phys., vol. 38, 11B, Part 2, pp. L1291–L1292, "High–Luminance Blue–Emitting BaAl$_2$S$_4$:Eu Thin–Film Electroluminescent Devices," Nov. 15, 1999.

S. Oshio, et al., Display and Imaging, vol. 3, No. 2, pps. 181–187, "Novel Electroluminescent Thin Films: Thiogallate–Type Phosphors," 1994 (with English Concise Explanasion).

P. C. Donohue, et al., J. Electrochem. Soc., vol. 121, No. 1, pps. 137–141, "The Synthesis and Photoluminescence of M "M$_2$"(S$_1$Se)$_4$", 1974.

I. Tanaka, et al., The 22nd Seminar data Photoelectric Inter–Conversion the 125$^{th}$ Commission El Department, Japan Society for the Promotion of Science, pps. 16–21, "Composition and Optical Properties of Blue–Emitting BaAl$_2$S$_4$Eu$^{2-}$ Electroluminescent Thin Films," May 26, 2000 (with English Concise Explanation and Abstract).

P. Benalloul, et al., Appl. Phys. Lett., vol. 63, No. 14, pps. 1954–1956, "IIA–III$_2$–S$_4$ Ternary Compounds: New Host Matrices for Full Color Thin Films Electroluminescence Displays," Oct. 4, 1993.

K. T. Le Thi, et al., Materials Science and Engineering, vol. B14, pps. 393–397, "Investigation of the MS–Al$_2$S$_3$ Systems (M=Ca, Sr, Ba) and Luminescence Properties of Europium–Doped Thioaluminates," 1992.

* cited by examiner

Primary Examiner—Nimeshkumar D. Patel
Assistant Examiner—Karabi Guharay
(74) Attorney, Agent, or Firm—Oblon, Spivak, McClelland, Maier & Neustadt, P.C.

(57) ABSTRACT

In an EL panel comprising EL phosphor thin films of three types which emit red, green and blue light, respectively, the EL phosphor thin films of three types commonly and essentially contain Eu as a luminescence center. The EL panel comprising such phosphor thin films eliminates a need for RGB phosphor filters, has a satisfactory color purity and is best suited for driving RGB in full-color EL display.

8 Claims, 2 Drawing Sheets

MULTI-COLOR EL PANEL COMPRISING PHOSPHOR THIN FILMS WITH EUROPIUM AS LUMINESCENT CENTER

TECHNICAL FIELD

This invention relates to an inorganic electroluminescent (EL) panel, and more particularly, to a full color EL panel having light emitting layers for the three primaries RGB.

BACKGROUND OF THE INVENTION

In the recent years, active research works have been made on thin-film EL devices as small or large-size, lightweight flat panel displays. A monochromatic thin-film EL display using a phosphor thin film of manganese-doped zinc sulfide capable of emitting yellowish orange light has already become commercially practical as a dual insulated structure using thin-film insulating layers 2 and 4 as shown in FIG. 2. In FIG. 2, a predetermined pattern of lower electrodes 5 is formed on a substrate 1, and a first insulating layer 2 is formed on the lower electrode-bearing substrate 1. On the first insulating layer 2, a light-emitting layer 3 and a second insulating layer 4 are successively formed. On the second insulating layer 4, a predetermined pattern of upper electrodes 6 is formed so as to construct a matrix circuit with the lower electrodes 5.

Thin-film EL displays must display images in color in order that they find use as computer, TV and similar monitors. Thin-film EL displays using sulfide phosphor thin films are fully reliable and resistant to environment, but at present regarded unsuitable as color displays because EL phosphors required to emit light in the primaries of red, green and blue have poor characteristics. Engineers continued research on SrS:Ce (using SrS as a matrix material and Ce as a luminescence center) and ZnS:Tm as a candidate for the blue light-emitting phosphor, ZnS:Sm and CaS:Eu as a candidate for the red light-emitting phosphor, and ZnS:Tb and CaS:Ce as a candidate for the green light-emitting phosphor.

These phosphor thin films capable of emitting light in the primaries of red, green and blue suffer from problems of emission luminance, emission efficiency and color purity. Thus color EL panels have not reached the commercial stage. Referring to the blue color among others, a relatively high luminance is achieved using SrS:Ce. However, its luminance is still short as the blue color for full-color display and its chromaticity is shifted toward green. There is a desire to have a better blue light-emitting layer.

To solve the above problem, thiogallate and thioaluminate base blue phosphors such as $SrGa_2S_4$:Ce, $CaGa_2S_4$:Ce, and $BaAl_2S_4$:Eu were developed as described in JP-A 7-122364, JP-A 8-134440, Communication Society Technical Report, EID 98-113, pp. 19–24, and Jpn. J. Appl. Phys., Vol. 38 (1999), pp. L1291–1292. These thiogallate base phosphors are satisfactory in color purity, but suffer from a low luminance and especially, difficulty to form a thin film of uniform composition because of the multi-component composition. It is believed that thin films of quality are not obtainable because of poor crystallinity resulting from inconvenient composition control, formation of defects resulting from sulfur removal, and admittance of impurities; and these factors lead to a failure to increase the luminance. In particular, thioaluminate base phosphors are quite difficult to control their composition.

In order to develop practical full-color EL panels, phosphor materials capable of providing blue, green and red phosphors in a consistent manner and at a low cost are necessary. Since matrix materials of phosphor thin films and luminescence center materials individually have differing chemical or physical properties as described above, light-emitting performance differs depending on the identity of the phosphor thin film. Especially, the response speed and afterglow of light emission differ between different luminescence centers. To drive blue, green and red pixels, a burning method matching with each color is necessary.

Moreover, the EL spectra of the aforementioned blue, green and red EL phosphor thin films are all broad. When they are used in a full-color EL panel, RGB necessary as the panel must be cut out of the EL spectra of the EL phosphor thin films using filters. Use of filters complicates the manufacture process and, still worse, brings about a lowering of luminance. When RGB is taken out through filters, the luminance of blue, green and red EL phosphor thin films suffers a loss of 10 to 50% so that the luminance is reduced below the practically acceptable level.

To solve the above-discussed problem, there remains a need for red, green and blue phosphor thin film materials capable of emitting light of a sufficient color purity to eliminate a need for filters and at a high luminance, as well as an EL panel in which an identical luminescence center is used in red, green and blue phosphor thin films so that they have the same response speed and afterglow of light emission, allowing a common drive method to be used to drive blue, green and red pixels, without a need for a separate burning method matching with each color.

SUMMARY OF THE INVENTION

An object of the invention is to provide an EL panel comprising phosphor thin films eliminating a need for RGB phosphor filters, having a satisfactory color purity and best suited for driving RGB in full-color EL display.

This and other objects are attained by the present invention which provides an EL panel comprising EL phosphor thin films of three types which emit red, green and blue light, respectively, the EL phosphor thin films of three types commonly and essentially containing europium as a luminescence center.

In one preferred embodiment, the EL phosphor thin films of three types have the compositional formula:

$A_xB_yO_zS_w$:R wherein A is at least one element selected from the group consisting of Mg, Ca, Sr, Ba and rare earth elements, B is at least one element selected from the group consisting of Al, Ga and In, x is in the range of 0 to 5, y is in the range of 0 to 15, z is in the range of 0 to 30, w is in the range of 0 to 30, and R is an element serving as the luminescence center and essentially containing europium.

In a further preferred embodiment, the EL phosphor thin film which emits red light is made of a matrix material comprising an alkaline earth sulfide, the EL phosphor thin film which emits green light is made of a matrix material comprising an alkaline earth thiogallate, and the EL phosphor thin film which emits blue light is made of a matrix material comprising an alkaline earth thioaluminate. Typically, the alkaline earth sulfide is calcium sulfide; the alkaline earth thiogallate is strontium thiogallate; and the alkaline earth thioaluminate is barium thioaluminate.

In a further preferred embodiment, the EL phosphor thin films of three types which emit red, green and blue light, respectively, each comprise an oxysulfide obtained by incorporating oxygen in at least one compound selected from the group consisting of an alkaline earth sulfide, alkaline earth thioaluminate, alkaline earth thiogallate, and alkaline earth thioindate. The molar ratio of oxygen element to sulfur element in the oxysulfide, as expressed by O/(S+O), is in the range between 0.01 and 0.85.

In another embodiment, any one of the EL phosphor thin films of three types which emit red, green and blue light, respectively, is made of an oxide.

DESCRIPTION OF THE PREFERRED EMBODIMENTS

Figure 1:
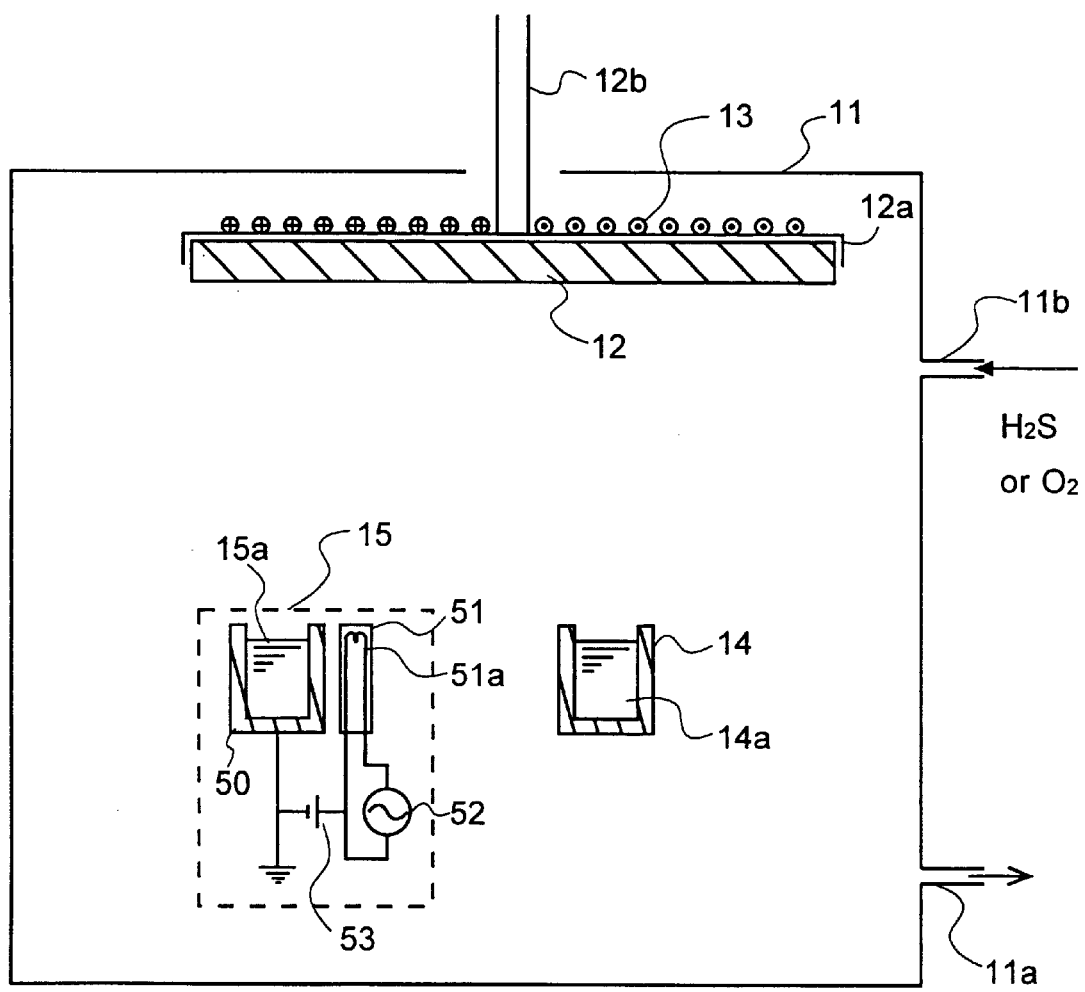
FIG. 1 is a schematic cross-sectional view showing an exemplary construction of manufacturing apparatus to which the invention is applicable.

The EL panel of the invention has EL phosphor thin films of three types which emit red, green and blue light, respectively. The element added as a luminescence center to the EL phosphor thin films of three types essentially contains at least europium (Eu) commonly to the three types.

The EL phosphor thin films of three types which emit red, green and blue light, respectively, each are made of a matrix material selected from among an alkaline earth sulfide, alkaline earth oxide, alkaline earth thioaluminate, alkaline earth aluminate, alkaline earth thiogallate, alkaline earth gallate, alkaline earth indate, and alkaline earth thioindate, to which at least Eu is added as the luminescence center.

These EL phosphor thin films emit red, green and blue light of a sufficient color purity to eliminate a need for filters and to a high luminance. Since Eu is used as a common luminescence center in red, green and blue phosphor thin films so that they have the same response speed and afterglow of light emission, the EL panel can use a common drive method to drive blue, green and red pixels, without a need for a separate burning method matching with each color.

For the emissions of red, green and blue light, light emission having a maximum wavelength in at least the wavelength region of 600 to 700 nm is referred to as red light, light emission having a maximum wavelength in at least the wavelength region of 500 to 600 nm is referred to as green light, and light emission having a maximum wavelength in at least the wavelength region of 400 to 500 nm is referred to as blue light.

Examples of the alkaline earth thioaluminates, alkaline earth aluminates, alkaline earth thiogallates, alkaline earth gallates, alkaline earth indates, and alkaline earth thioindates used in EL phosphor thin films include $A_5B_2C_8$, $A_4B_2C_7$, $A_2B_2C_5$, $AB_2C_4$, $AB_4C_7$, $A_{4\ AB12}Cl_{19}$, etc. wherein A is an alkaline earth element, B is aluminum (Al), gallium (Ga) or indium (In) and C is sulfur or oxygen. The matrix material may use these compounds alone or in admixture of two or more and take an amorphous state where a distinct crystalline structure is absent.

The alkaline earth element is selected from Be, Mg, Ca, Sr, Ba and Ra. Of these, Mg, Ca, Sr and Ba are preferred, with Ba and Sr being especially preferred.

The element to be combined with the alkaline earth element is Al, Ga or In, and any desired combination is possible.

The phosphor thin film further contains sulfur and oxygen in the matrix material and preferably has the following compositional formula:

$$A_xB_yO_zS_w:R$$

wherein A is at least one element selected from the group consisting of Mg, Ca, Sr, Ba and rare earth elements; B is at least one element selected from Al, Ga and In; and R is an element serving as a luminescence center and essentially containing Eu.

In the above formula, x, y, z and w denote molar ratios of elements A, B, O and S, respectively, and are preferably in the ranges of x=0 to 5, y=0 to 15, z=0 to 30, and w=0 to 30, and more preferably, x=1 to 5, y=1 to 15, z=3 to 30, and w=3 to 30.

Oxygen is contained in the alkaline earth sulfide matrix material, preferably in such amounts that the atomic ratio of oxygen to sulfur in the matrix material, as expressed by O/(S+O), is in the range from 0.01 to 0.85, and especially from 0.05 to 0.5. Differently stated, the value of z/(z+w) in the formula is preferably in the range of 0.01 to 0.85, more preferably 0.05 to 0.5, even more preferably 0.1 to 0.4, and especially 0.2 to 0.3.

The composition of the phosphor thin film can be ascertained by x-ray fluorescence analysis (XRF), x-ray photoelectron spectroscopy (XPS) or the like.

Oxygen is effective for outstandingly enhancing the electroluminescent luminance of phosphor thin films. The light emitting device has a lifetime in that the luminance drops with the lapse of light emitting time. The addition of oxygen improves the lifetime performance and prevents the luminance from dropping. The addition of oxygen to sulfide promotes crystallization of the matrix material during film deposition or during post treatment such as annealing after film deposition, and permits the rare earth element added to undertake effective transition within the compound crystal field, producing stable light emission at a high luminance. As compared with the matrix material of pure sulfide, the matrix material having oxygen added thereto is stable in air. This is presumably because the stable oxide component protects the sulfide component in the film from the ambient air.

In an alternative embodiment, the EL phosphor thin films are made of oxides. The oxides have an improved emission life and environmental resistance.

The oxides preferably have the following compositional formula:

$$A_xB_yO_z:R$$

wherein A is at least one element selected from the group consisting of Mg, Ca, Sr, Ba and rare earth elements; B is at least one element selected from Al, Ga and In; and R is an element serving as a luminescence center and essentially containing Eu.

[0027/28]

In the above formula, x, y and z denote molar ratios of elements A, B and O, respectively, and are preferably in the ranges of x=0 to 5, y=0 to 15, and z=0 to 30, and more preferably, x=1 to 5, y=1 to 15, and z=3 to 30.

[0029/30]

Of the phosphor thin films mentioned above, the phosphor thin film for blue light is preferably made of $Ba_xAl_yO_zS_w:Eu$. Oxides wherein w=0 are also preferable, with $Ca_xAl_yO_z:Eu$ being especially preferred.

[0031/32]

The phosphor thin film for green light is most preferably made of $Sr_xGa_yO_zS_w:Eu$. Oxides wherein w=0 are also preferable, with $Sr_xAl_yO_z:Eu$ being especially preferred.

The phosphor thin film for red light is preferably made of a matrix material of alkaline earth indate having Eu added as the luminescence center, or a matrix material of alkaline earth sulfide having Eu added as the luminescence center. Oxides wherein w=0 as typified by $Ga_2O_3$ are also preferable.

The alkaline earth element is selected from Be, Mg, Ca, Sr, Ba and Ra. Of these, Mg, Ca, Sr and Ba are preferred. In the case of sulfides wherein z=0, Ca is preferred while mixtures of two or more such as mixtures of Ca+Sr or Ca+Mg are also acceptable. In the case of oxides wherein w=0, Mg is preferred.

No particular limits are imposed on the thickness of the phosphor thin film. However, too thick a film requires an increased drive voltage whereas too thin a film results in a low emission efficiency. Illustratively, the phosphor thin film is preferably about 100 to 2,000 nm thick, especially about 150 to 700 nm although the thickness varies depending on the identity of phosphor material.

An appropriate amount of Eu added as the luminescence center is 0.1 to 10 at % based on the alkaline earth atoms. For CaS, an appropriate amount of Eu added is 0.1 to 0.5 at %, and most preferably 0.2 to 0.4 at %. The element added as the luminescence center must contain Eu according to the invention. Eu may be added alone or in combination with one or more other elements. For example, the addition of Cu or Ce to Eu as the luminescence center can improve the response and luminance of light emission.

A red phosphor thin film may have a thickness of about 50 to 300 nm, and preferably about 150 to 250 nm. Too thick a film may require an increased drive voltage and adversely affect the response, taking several seconds to several tens of seconds until emission. Too thin a film may result in a low emission efficiency. A film thickness in the above range ensures that an EL device is improved in both the response and luminance of light emission.

In a preferred embodiment, red, green and blue phosphor thin films each have a structure of ZnS thin film/phosphor film/ZnS thin film. As long as the phosphor thin film is thin, the sandwiching between ZnS thin films is effective for improving the electric charge injection and withstand voltage of the phosphor thin film, resulting in an EL device capable of emitting light at a high luminance. This is true especially when CaS:Eu is used as the phosphor thin film, providing a red EL thin film with a high luminance and good response. The ZnS thin film may have a thickness of about 30 to 400 nm, and preferably about 100 to 300 nm.

In another preferred embodiment, red, green and blue phosphor thin films each may have a structure of ZnS thin film/phosphor thin film/ZnS thin film, a structure of ZnS thin film/phosphor thin film/ZnS thin film/phosphor thin film/ZnS thin film, or a multilayer structure of ZnS thin film/phosphor thin film/ZnS thin film (repeated) /phosphor thin film/ZnS thin film.

Such phosphor thin films are preferably prepared, for example, by the following evaporation process.

An alkaline earth sulfide having Eu added is prepared. In a vacuum chamber, the source is evaporated by irradiating electron beams. By the EB evaporation of this source alone or together with the evaporation of thioaluminate, thiogallate or thioindate by resistive heating, Eu-doped alkaline earth sulfide, alkaline earth thiogallate, alkaline earth thioaluminate or alkaline earth thioindate is formed. The composition is reached by adjusting the power to the respective sources. $H_2S$ gas may be introduced during evaporation.

Eu added to the source substance may take the form of metal, fluoride, oxide or sulfide. Since the amount of Eu added varies depending on the source substance and the thin film to be deposited, the composition of the source substance is adjusted so as to achieve an appropriate dosage.

During the evaporation, the temperature of the substrate may be at room temperature to 600° C., preferably 300 to 500° C. If the substrate temperature is too high, the thin film of matrix material may have more asperities on its surface and contain pin holes therein, giving rise to the problem of current leakage on EL devices. Also the thin film can be colored brown. For this reason, the aforementioned temperature range is preferable. The film deposition is preferably followed by annealing. The preferred annealing temperature is 600 to 1,000° C., and more preferably about 600 to 800° C.

The sulfide phosphor thin film thus formed is preferably a highly crystalline thin film. Crystallinity can be evaluated by x-ray diffraction, for example. To promote crystallinity, the substrate temperature is set as high as possible. It is also effective to anneal the thin film in vacuum, $N_2$, Ar, air, sulfur vapor or $H_2S$ after its formation.

No particular limits are imposed on the thickness of the light emitting layer. However, too thick a layer requires an increased drive voltage whereas too thin a layer results in a low emission efficiency. Illustratively, the light emitting layer is preferably about 100 to 2,000 nm thick, especially about 150 to 700 nm although the thickness varies depending on the identity of phosphor material.

The pressure during evaporation is preferably $1.33 \times 10^{-4}$ to $1.33 \times 10^{-1}$ Pa ($1 \times 10^{-6}$ to $1 \times 10^{-3}$ Torr). When a gas such as $H_2S$ is introduced, the pressure may be adjusted to $6.65 \times 10^{-3}$ to $6.65 \times 10^{-2}$ Pa ($5 \times 10^{-5}$ to $5 \times 10^{-4}$ Torr). If the pressure exceeds the range, the operation of the electron gun becomes unstable, and composition control becomes very difficult. The rate of gas feed is preferably 5 to 200 standard cubic centimeters per minute (SCCM), especially 10 to 30 SCCM although it varies depending on the capacity of the vacuum system.

If desired, the substrate may be moved or rotated during evaporation. By moving or rotating the substrate, the deposited film becomes uniform in composition and minimized in the variation of thickness distribution.

When the substrate is rotated, the number of revolutions is preferably at least about 10 rpm, more preferably about 10 to 50 rpm, and especially about 10 to 30 rpm. If the rotational speed of the substrate is too high, there may arise a problem of seal upon admission into the vacuum chamber. If the rotational speed of the substrate is too low, compositional gradation may occur in the thickness direction within the chamber so that the resulting light emitting layer may have poor characteristics. The means for rotating the substrate may be any well-known rotating mechanism including a power source such as a motor or hydraulic rotational mechanism and a power transmission/gear mechanism having a combination of gears, belts, pulleys and the like.

The means for heating the evaporation source and the substrate may be selected, for example, from tantalum wire heaters, sheath heaters and carbon heaters, as long as they have the predetermined thermal capacity, reactivity or the like. The temperature reached by the heating means is preferably in the range of about 100 to about 1,400° C., and the precision of temperature control is about ±1° C., preferably about ±0.5° C. at 1,000° C.

FIG. 1 illustrates one exemplary construction of the apparatus for forming the light emitting layer according to the invention. Reference is made to an embodiment wherein Eu-doped alkaline earth sulfide, alkaline earth thiogallate, alkaline earth thioaluminate or alkaline earth thioindate is produced by using Eu-added alkaline earth sulfide and any one of thiogallate, thioaluminate and thioindate as the evaporation sources and admitting $H_2S$ during evaporation.

In the illustrated embodiment, a substrate 12 on which the light emitting layer is to be deposited, a resistive heating evaporation source in the form of a Knudsen cell 14 and an EB evaporation source 15 are disposed within a vacuum chamber 11.

In the resistive heating evaporation source or K cell 14 serving as means for evaporating alkaline earth sulfide, an alkaline earth sulfide 14a having a luminescence center added thereto is contained. The K cell 14 is heated by a heater (not shown) so that the metal material may evaporate at a desired evaporation rate.

The electron beam (EB) evaporation source 15 serving as means for evaporating thioaluminate, thiogallate or thioindate include a crucible 50 which contains thioaluminate, thiogallate or thioindate 15a and an electron gun 51 having an electron emitting filament 51a built therein. Built in the electron gun 51 is a mechanism for controlling an electron beam. To the electron gun 51 are connected an ac power supply 52 and a bias power supply 53. The electron gun 51 produces an electron beam at a predetermined power in a controlled manner, for evaporating the thioaluminate, thiogallate or thioindate 15a at a predetermined rate. Although the evaporation source is controlled by the K cell and electron gun in the illustrated embodiment, multi-source simultaneous evaporation using a single electron gun is also possible. The evaporation process of the latter is known as multisource pulse evaporation process.

In the illustrated embodiment, the evaporation sources 14 and 15 are depicted, for the convenience of illustration, at positions corresponding to discrete local areas of the substrate. Actually, the evaporation sources are located such that the deposited film may become uniform in composition and thickness.

The vacuum chamber 11 has an exhaust port 11a through which the chamber is evacuated to establish a predetermined vacuum in the chamber. The vacuum chamber 11 also has an inlet port 11b through which a reactant gas such as hydrogen sulfide is admitted into the chamber.

The substrate 12 is fixedly secured to a holder 12a. The holder 12a has a shaft 12b which is rotatably held by an outside rotating shaft mount (not shown) so that the vacuum may be maintained in the chamber 11. The shaft 12b is adapted to be rotated at a predetermined number of revolutions by a rotating means (not shown). A heating means 13 in the form of a heater wire is closely secured to the substrate holder 12a so that the substrate may be heated and maintained at the desired temperature.

Using the illustrated apparatus, the vapor of alkaline earth sulfide and the vapor of thioaluminate, thiogallate or thioindate are evaporated from the K cell 14 and EB evaporation source 15 and deposited on the substrate 12 where they are bound together to form a fluorescent layer of Eu-doped alkaline earth sulfide, alkaline earth thiogallate, alkaline earth thioaluminate or alkaline earth thioindate. By rotating the substrate 12 during the evaporation process if desired, the light emitting layer being deposited can be made more uniform in composition and thickness distribution.

Figure 2:
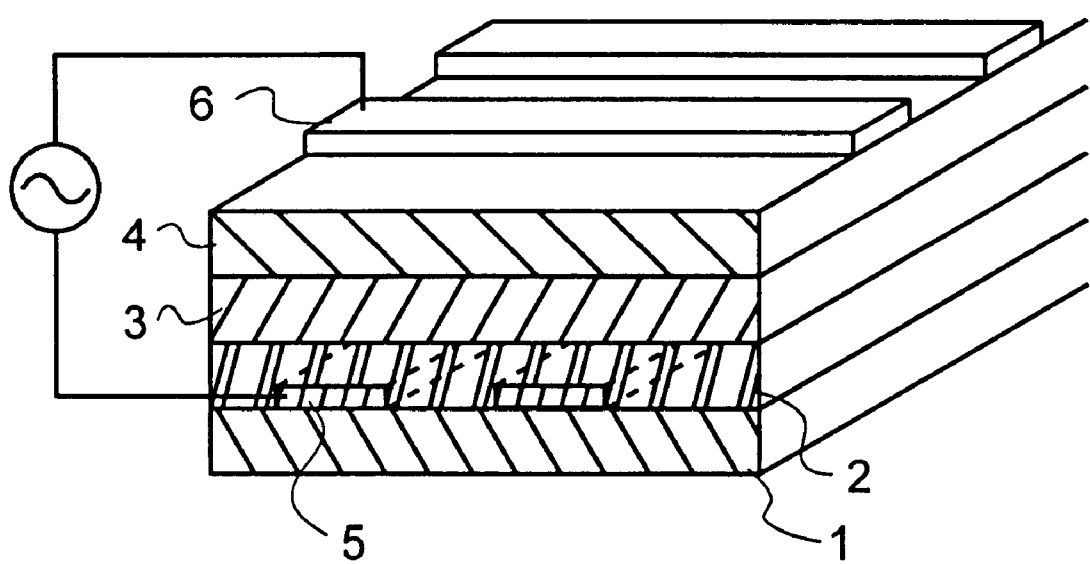
FIG. 2 is a partially cross-sectional, perspective view showing an exemplary construction of an inorganic EL device according to the invention.

Using the phosphor thin film of the invention as a light emitting layer 3, an inorganic EL device is manufactured, for example, to the structure shown in FIG. 2.

FIG. 2 is a partially cross-sectional, perspective view showing an exemplary construction of the inorganic EL device using the light emitting layer of the invention. In FIG. 2, a predetermined pattern of lower electrodes 5 is formed on a substrate 1, and a first thick insulating layer (or thick-film dielectric layer) 2 is formed on the lower electrodes 5. On the first insulating layer 2, a light-emitting layer 3 and a second insulating layer (or thin-film dielectric layer) 4 are successively formed. On the second insulating layer 4, a predetermined pattern of upper electrodes 6 is formed so as to construct a matrix circuit with the lower electrodes 5. The red, green or blue phosphor thin film is selectively coated at the intersections of matrix electrodes.

Between two adjacent ones of the substrate 1, electrodes 5, 6, thick-film insulating layer 2 and thin-film insulating layer 4, an intermediate layer such as a bond enhancing layer, stress relief layer or reaction preventing barrier layer may be disposed. The thick film may be improved in smoothness as by polishing its surface or using a smoothing layer.

Preferably, a $BaTiO_3$ thin-film layer is formed as the barrier layer between the thick-film insulating layer and the thin-film insulating layer.

Any desired material may used as the substrate as long as the substrate has a heat resistant temperature or melting point of at least 600° C., preferably at least 700° C., especially at least 800° C. so that the substrate may withstand the thick-film forming temperature, the forming temperature of the EL fluorescent layer and the annealing temperature of the EL device, the substrate allows deposition thereon of functional thin films such as a light emitting layer by which the EL device can be constructed, and the substrate maintains the predetermined strength. Illustrative examples include glass substrates, ceramic substrates of alumina ($Al_2O_3$), forsterite ($2MgO \cdot SiO_2$), steatite ($MgO \cdot SiO_2$), mullite ($3Al_2O_3 \cdot 2SiO_2$), beryllia (BeO), aluminum nitride (AlN), silicon nitride (SiN), and silicon carbide (SiC+BeO) as well as heat resistant glass substrates of crystallized glass or the like. Of these, alumina substrates and crystallized glass substrates are especially preferable. Where heat transfer is necessary, beryllia, aluminum nitride, silicon carbide and the like are preferred.

Also useful are quartz, heat oxidized silicon wafers, etc. as well as metal substrates such as titanium, stainless steel, Inconel and iron base materials. Where electro-conductive substrates such as metal substrates are used, a structure in which a thick film having an internal electrode is formed on a substrate is preferred.

Any well-known thick-film dielectric material may be used as the thick-film dielectric material (first insulating layer). Materials having a relatively high permittivity are preferred.

For example, lead titanate, lead niobate and barium titanate based materials can be used.

The dielectric thick film has a resistivity of at least $10^8$ $\Omega \cdot cm$, especially about $10^{10}$ to $10^{18}$ $\Omega \cdot cm$. A material having a relatively high permittivity as well is preferred. The permittivity $\epsilon$ is preferably about 100 to 10,000. The preferred thickness is 5 to 50 $\mu m$, especially 10 to 30 $\mu m$.

The insulating layer thick film is formed by any desired method. Methods capable of relatively easily forming films of 10 to 50 $\mu m$ thick are useful, and the sol-gel method and printing/firing method are especially preferred.

Where the printing/firing method is employed, a material is fractionated to an appropriate particle size and mixed with a binder to form a paste having an appropriate viscosity. The paste is applied onto a substrate by a screen printing technique, and dried. The green sheet is fired at an appropriate temperature, yielding a thick film.

Examples of the material of which the thin-film insulating layer (second insulating layer) is made include silicon oxide ($SiO_2$), silicon nitride (SiN), tantalum oxide ($Ta_2O_5$), strontium titanate ($SrTiO_3$), yttrium oxide ($Y_2O_3$), barium titanate ($BaTiO_3$), lead titanate ($PbTiO_3$), PZT, zirconia ($ZrO_2$), silicon oxynitride (SiON), alumina ($Al_2O_3$), lead niobate, PMN-PT base materials, and multilayer or mixed thin films of any. In forming the insulating layer from these materials, any of conventional methods such as evaporation, sputtering, CVD, sol-gel and printing/firing methods may be used. The insulating layer preferably has a thickness of about 50 to 1,000 nm, especially about 100 to 500 nm.

The electrode (lower electrode) is formed at least on the substrate side or within the first dielectric layer. As the electrode layer which is exposed to high temperature during formation of a thick film and during heat treatment along with the light emitting layer, use may be made of a customary metal electrode containing as a main component one or more elements selected from palladium, rhodium, iridium, rhenium, ruthenium, platinum, tantalum, nickel, chromium and titanium.

Another electrode layer serving as the upper electrode is preferably a transparent electrode which is transmissive to light in the predetermined emission wavelength region because the emitted light often exits from the opposite side to the substrate. When the substrate and insulating layer are transparent, a transparent electrode may also be used as the lower electrode because this permits the emitted light to exit from the substrate side. Use of transparent electrodes of ZnO, ITO or the like is especially preferred. ITO generally contains $In_2O_3$ and SnO in stoichiometry although the oxygen content may deviate somewhat therefrom. An appropriate proportion of $SnO_2$ mixed with $In_2O_3$ is about 1 to 20%, more preferably about 5 to 12% by weight. For IZO, an appropriate proportion of ZnO mixed with $In_2O_3$ is generally about 12 to 32% by weight.

Also the electrode may be a silicon-based one. The silicon electrode layer may be either polycrystalline silicon (p-Si) or amorphous silicon (a-Si), or even single crystal silicon if desired.

In addition to silicon as the main component, the electrode is doped with an impurity for imparting electric conductivity. Any dopant may be used as the impurity as long as it can impart the desired conductivity. Use may be made of dopants commonly used in the silicon semiconductor art. Exemplary dopants are B, P, As, Sb, Al and the like. Of these, B, P, As, Sb and Al are especially preferred. The preferred dopant concentration is about 0.001 to 5 at %.

In forming the electrode layer from these materials, any of conventional methods such as evaporation, sputtering, CVD, sol-gel and printing/firing methods may be used. In forming a structure in which a thick film having an internal electrode is formed on a substrate, the same method as used in forming the dielectric thick film is preferred.

The electrode layer should preferably have a resistivity of up to 1 Ω·cm, especially about 0.003 to 0.1 Ω·cm in order to apply an effective electric field across the light emitting layer. The preferred thickness of the electrode layer is about 50 to 2,000 nm, especially about 100 to 1,000 nm although it depends on the electrode material.

The EL panel of the invention has been described while it can be applied to other forms of display device, typically full-color panels, multicolor panels and partial color panels partially displaying three colors.

EXAMPLE

Examples are given below for illustrating the invention in more detail.

Example 1

An EL panel according to the invention was fabricated. For the substrate and thick-film insulating layer, $BaTiO_3$ base dielectric material having a permittivity of 5,000 was commonly used. For the lower electrode, a Pd electrode was used. On fabrication, a sheet of the substrate was formed, and the lower electrode and thick-film insulating layer were screen printed thereon to form a green sheet, which was co-fired. The surface was polished, obtaining a substrate bearing a thick-film first insulating layer of 30 μm thick. On this substrate, a $BaTiO_3$ coating was formed by sputtering as a buffer layer to 400 nm. This was annealed in air at 700° C., obtaining a composite substrate.

On the composite substrate, phosphor thin films of three types, red, green and blue each were formed as a structure of $Al_2O_3$ film (50 nm)/ZnS film (200 nm)/phosphor thin film or light emitting layer (300 nm)/ZnS film (200 nm)/$Al_2O_3$ film (50 nm) in order that the resulting EL device produce stable light emission.

To form the phosphor thin film of each color at predetermined sites, a masking pattern was previously furnished for each color, and each film was partially formed by masked evaporation.

For the phosphor thin films of three types, red, green and blue, CaS, $SrGs_2S_4$ and $BaAl_2S_4$ base phosphor thin films were used, respectively. In every film, Eu was used as the luminescence center.

The red phosphor thin film was prepared by the following procedure. Used for this film formation was an apparatus as shown in FIG. 1 wherein only one electron gun was used. An EB source 15 loaded with CaS powder having 0.5 mol % Eu added was placed in a vacuum chamber 11 into which $H_2S$ gas was admitted. The CaS was evaporated from the source and deposited on a rotating substrate heated at 400° C., forming a thin film. The evaporation rate of the source was adjusted such that the film was deposited on the substrate at a deposition rate of 1 nm/sec. The $H_2S$ gas was fed at 20 SCCM. In this way, a phosphor thin film was formed. Specifically the thin film was obtained as the structure of $Al_2O_3$ film (50 nm)/ZnS film (200 nm)/phosphor thin film (300 nm)/ZnS film (200 nm)/$Al_2O_3$ film (50 nm). The structure was annealed in air at 750° C. for 10 minutes.

Similarly, a phosphor thin film was formed on a Si substrate. The resulting phosphor thin film in the form of CaS:Eu thin film was analyzed for composition by fluorescent x-ray analysis, finding an atomic ratio of Ca:S:Eu= 24.07:25.00:0.15.

The green phosphor thin film was prepared by the following procedure. Used for this film formation was an apparatus as shown in FIG. 1 wherein one electron gun and one resistive heating evaporation source (cell) were used. An EB source 15 loaded with SrS powder having 5 mol % Eu added and a resistive heating source 14 loaded with $Ga_2S_3$ powder were placed in a vacuum chamber 11 into which $H_2S$ gas was admitted. The reactants were evaporated from the respective sources and deposited on a rotating substrate heated at 400° C., forming a thin film. The evaporation rates of the respective sources were adjusted such that the film was deposited on the substrate at a deposition rate of 1 nm/sec. The $H_2S$ gas was fed at 20 SCCM. In this way, a phosphor thin film was formed. Specifically the thin film was obtained as the structure of $Al_2O_3$ film (50 nm)/ZnS film (200 nm)/phosphor thin film (300 nm)/ZnS film (200 nm)/ $Al_2O_3$ film (50 nm). The structure was annealed in air at 750° C. for 10 minutes.

Similarly, a phosphor thin film was formed on a Si substrate. The resulting phosphor thin film in the form of $Sr_xGa_yO_zS_w$:Eu thin film was analyzed for composition by fluorescent x-ray analysis, finding an atomic ratio of Sr:Ga:O:S:Eu=6.02:19.00:11.63:48.99:0.34.

The blue phosphor thin film was prepared by the following procedure. Used for this film formation was an apparatus as shown in FIG. 1 wherein one electron gun and one resistive heating evaporation source (cell) were used.

An EB source 15 loaded with BaS powder having 5 mol % Eu added and a resistive heating source 14 loaded with $Al_2S_3$ powder were placed in a vacuum chamber 11 into which $H_2S$ gas was admitted. The reactants were evaporated from the respective sources and deposited on a rotating substrate heated at 400° C., forming a thin film. The evaporation rates of the respective sources were adjusted such that the film was deposited on the substrate at a deposition rate of 1 nm/sec. The $H_2S$ gas was fed at 20 SCCM. In this way, a phosphor thin film was formed. Specifically the thin film was obtained as the structure of $Al_2O_3$ film (50 nm)/ZnS film (200 nm)/phosphor thin film (300 nm)/ZnS film (200 nm)/$Al_2O_3$ film (50 nm). The structure was annealed in air at 750° C. for 10 minutes.

Similarly, a phosphor thin film was formed on a Si substrate. The resulting phosphor thin film in the form of $Ba_xAl_yO_zS_w$:Eu thin film was analyzed for composition by fluorescent x-ray analysis, finding an atomic ratio of Ba:Al:O:S:Eu=8.91:18.93:9.33:28.05:0.35.

By RF magnetron sputtering technique using an ITO oxide target, a transparent ITO electrode of 200 nm thick was formed on the resulting structure at a substrate temperature of 250° C. The electrode was patterned to complete an EL device of the matrix structure.

An electric field having a frequency of 240 Hz and a pulse width of 50 μS at seven different voltages was applied to the two electrodes of each matrix in the EL panel, providing each color with 8 bit gradation. The EL panel emitted light in 512 colors at an average luminance of 100 cd/m² and with a good response.

Example 2

The procedure of Example 1 was repeated using a $SrAl_2O_4$:Eu thin film as the green phosphor instead of the $Sr_xGa_yO_zS_w$:Eu thin film. Substantially equivalent results were obtained.

The EL panel of the invention employs red, green and blue phosphor thin film materials capable of light emission of a good color purity and high luminance without a need for filters, and differently stated, phosphor matrix materials having analogous chemical or physical properties and doped with Eu as the luminescence center commonly for all three colors. This leads to the advantages of simplified driving of a full color EL panel, minimized luminance variation, increased manufacturing yield, and reduced manufacturing cost of the panel including circuitry. The invention is of great commercial worth.

There has been described an EL panel comprising phosphor thin films eliminating a need for RGB phosphor filters, having a satisfactory color purity and best suited for driving RGB in full-color EL display.

Japanese Patent Application No. 2001-228272 is incorporated herein by reference.

What is claimed is:

1. An EL panel comprising EL phosphor thin films of three types which emit red, green and blue light, respectively, the EL phosphor thin films of three types commonly and essentially containing europium as a luminescence center.

2. The EL panel of claim 1 wherein the EL phosphor thin films of three types have the compositional formula:

$A_xB_yO_zS_w$:R wherein A is at least one element selected from the group consisting of Mg, Ca, Sr, Ba and rare earth elements, B is at least one element selected from the group consisting of Al, Ga and In, x is in the range of 0 to 5, y is in the range of 0 to 15, z is in the range of 0 to 30, w is in the range of 0 to 30, and R is an element serving as the luminescence center and essentially containing europium.

3. The EL panel of claim 1 wherein the EL phosphor thin film which emits red light is made of a matrix material comprising an alkaline earth sulfide, the EL phosphor thin film which emits green light is made of a matrix material comprising an alkaline earth thiogallate, and the EL phosphor thin film which emits blue light is made of a matrix material comprising an alkaline earth thioaluminate.

4. The EL panel of claim 3 wherein the alkaline earth sulfide is calcium sulfide.

5. The EL panel of claim 3 wherein the alkaline earth thiogallate is strontium thiogallate.

6. The EL panel of claim 3 wherein the alkaline earth thioaluminate is barium thioaluminate.

7. The EL panel of claim 1 wherein the EL phosphor thin films of three types which emit red, green and blue light, respectively, each comprise an oxysulfide obtained by incorporating oxygen in at least one compound selected from the group consisting of an alkaline earth sulfide, alkaline earth thioaluminate, alkaline earth thiogallate, and alkaline earth thioindate, and the molar ratio of oxygen element to sulfur element in said oxysulfide, as expressed by O/(S+O), is in the range between 0.01 and 0.85.

8. The EL panel of claim 1 wherein any one of the EL phosphor thin films of three types which emit red, green and blue light, respectively, is made of an oxide.

* * * * *